Aug. 4, 1953 J. E. KOCHIE 2,647,863
APPARATUS FOR THE CONTROL OF DISTILLATION REFLUX
Filed Oct. 24, 1950 3 Sheets-Sheet 1

Inventor
JOSEPH E. KOCHIE
By E. Francis Wentworth Jr.
Attorney

Aug. 4, 1953  J. E. KOCHIE  2,647,863
APPARATUS FOR THE CONTROL OF DISTILLATION REFLUX
Filed Oct. 24, 1950  3 Sheets-Sheet 2
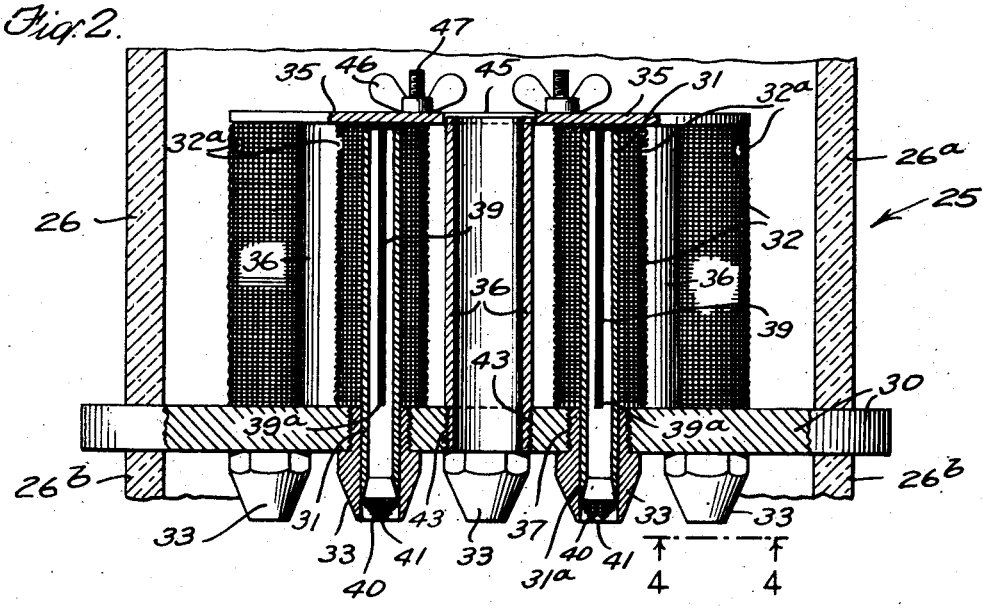
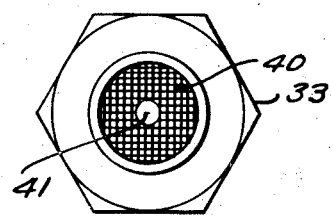
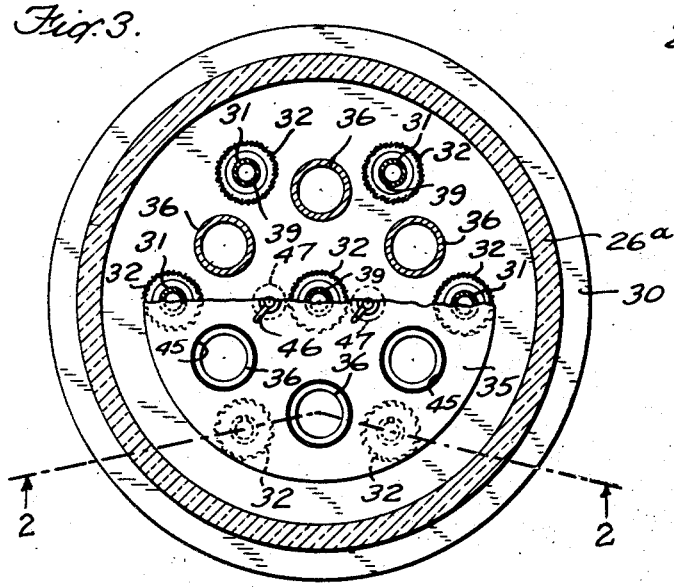
Inventor
JOSEPH E. KOCHIE
By E. Francis Wentworth Jr.
Attorney Aug. 4, 1953 J. E. KOCHIE 2,647,863
APPARATUS FOR THE CONTROL OF DISTILLATION REFLUX
Filed Oct. 24, 1950 3 Sheets-Sheet 3

Inventor
JOSEPH E. KOCHIE
By E. Francis Wentworth Jr.
Attorney

Patented Aug. 4, 1953

2,647,863

UNITED STATES PATENT OFFICE 2,647,863

APPARATUS FOR THE CONTROL OF DISTILLATION REFLUX

Joseph E. Kochie, Carteret, N. J., assignor to Foster-Wheeler Corporation, New York, N. Y., a corporation of New York Application October 24, 1950, Serial No. 191,768

15 Claims. (Cl. 202—158)

This invention relates to a structure for the separation of liquids by distillation or fractionation and more particularly to distribution means useful in such separation or fractionation.

In the separation of liquids by distillation, the apparatus generally used consists essentially of a still, a condenser and a packed column. The latter is a shell filled with some inert solid material containing small void passages. The column is mounted between the still and the condenser so that during the distillation, when heat is applied to the liquid mixture in the still, an upward flow of vapor is created which rises to the column and continues upward until it is chilled by the condenser, where it falls back onto the packing in the form of a liquid. The descending liquid, or reflux, now flowing down through the packing is brought into contact with the ascending vapors and exchanges of heat and material take place. Part of the volatile components in the vapor are condensed through abstraction of heat by the reflux. The heat absorbed by the reflux causes vaporization of its more volatile components, thereby enriching the vapor in lower boiling fractions. The efficiency with which these heat and material changes take place in the column depends largely on the distribution of reflux over the packing. If the liquid returning from the condenser channels and allows part of the packing to run dry, it will decrease the number of total interphase contacts, reducing the quantity of light material leaving the reflux and heavy material leaving the vapor, thereby hindering the efficiency of the column.

In the past, reflux in distillation columns has been distributed by allowing the liquid to fall onto a level plate (inserted between the condenser and the column), containing orifices sufficient in number to effect desired wetting of the packing. However, the orifices had a small flow range which when exceeded caused the apparatus to flood; when the reflux range fell below it, liquid would flow through some of the orifices and not through others, giving rise to poor liquid distribution. In either case, it was necessary to undergo the expense of stopping the distillation, cooling the unit and of changing the orifices. When the column was reassembled, time was lost in heating and adjusting the unit until the proper distilling conditions had again been attained.

Objects and features of this invention are the provision of novel distribution means intended to replace those described above which will be more efficient in the distribution of reflux liquids where the reflux rates vary over wide ranges and with which shut downs and incidental expenses of the character noted above are eliminated.

Further objects and features of the invention are the provision of novel distribution means for liquids, useful wherever liquid distribution means are utilized to provide improved distribution over a wide range of flow rates of the liquid being distributed.

Other objects and novel features will become apparent from the following description and accompanying drawings wherein:

Fig. 2 is a vertical section taken along line 2—2 of Fig. 3 illustrating details of construction of the distribution means embodying the invention;

Fig. 3 is a plan view of the construction of Fig. 2;

Fig. 4 is a fragmentary bottom elevation taken along line 4—4 of Fig. 2 and viewed in the direction of the arrows.

Figure 1:
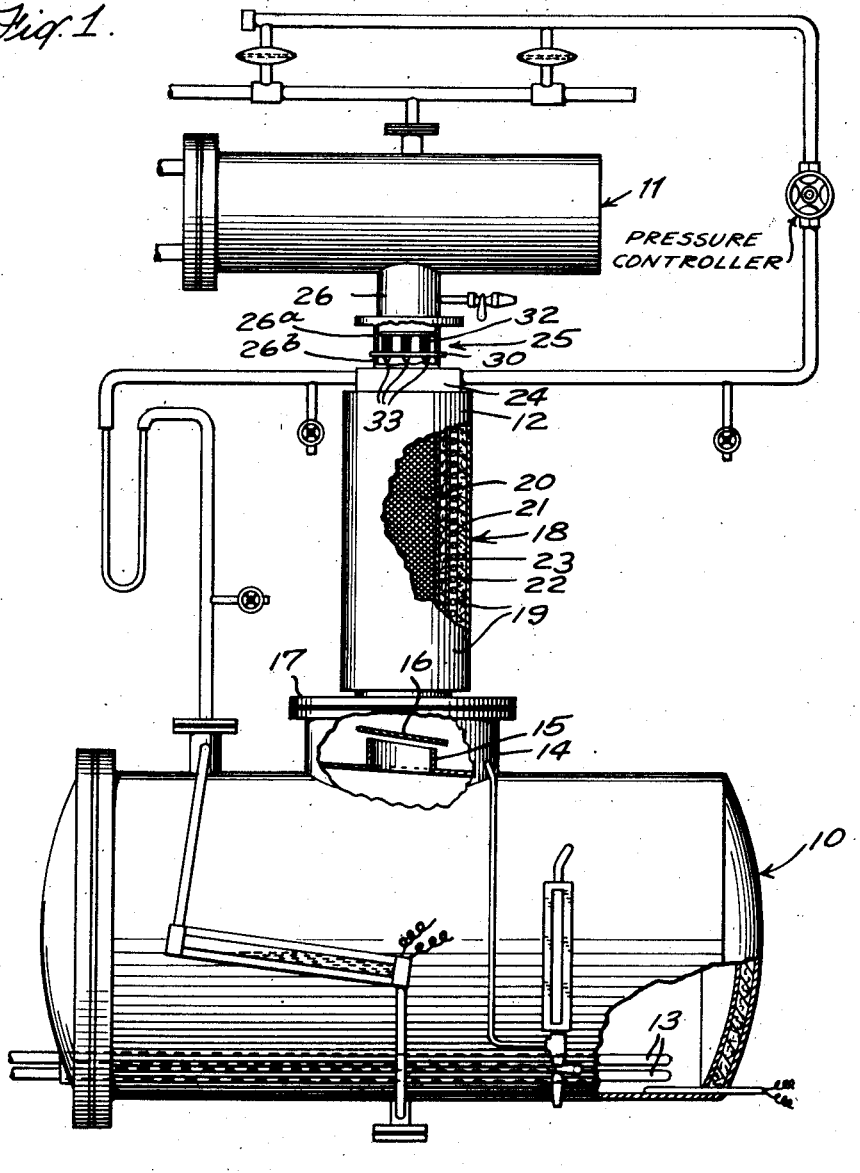
Fig. 1 is a diagrammatic elevation partially in vertical section illustrating a use of the device embodying the invention in its relationship to a system for separation of liquids by distillation.

Referring to the drawing and first to Fig. 1, a distillation system is there shown which includes a still 10, a condenser 11 and a packed column positioned between the vapor outlet of the still and the condenser 11. The still 10 is of a conventional type adapted to vaporize volatile liquid material and has a conventional heater 13. The still reflux head 14 of conventional type includes a vapor outlet 15 and baffle 16. The reflux head 14 is connected at 17 to the vertically disposed packed column 18. This column includes a shell 19 filled with an inert solid material 20 containing small voids and an electrically insulated heating element 21 surrounding the packing 20. Layers 22, 23 of fiber glass or other suitable material surrounds the column and the heating element to minimize heat losses between the column and the atmosphere. The upper head 24 of the column 18 is connected through the distribution means 25 and conduit 26 to the condenser 11. The column 18 thus is positioned between the still 10 and the condenser 11 so that during the distillation by heat applied by heater 13 of the still to its liquid content, an upward flow of vapor is created which rises to the column 18 and continues upward through its packing 20 and passes through appropriate risers as will be described in the distribution means 25 and via conduit 26 into the condenser 11 where it is condensed by chilling. The condensate as reflux liquid falls back onto the packing 20 of the column 18 after distribution in distribution means 25 as will be described. The liquid condensate or reflux effluent from the distribution means 25 passing downwardly through the voids in the packing 20 is brought into intimate contact with the ascending vapors in the column with resultant exchanges of heat and material. Part of the volatile components of the ascending vapor are condensed by heat exchange with the reflux condensate. The heat absorbed by the reflux condensate causes vaporization of its more volatile components thereby enriching the upward vapor flow in lower boiling point fractions.

As indicated hereinabove, unless distribution of reflux liquid is efficient over a wide range of reflux flow rates, the poor reflux distribution results in flow through some voids only in the packing material and not through others with consequent loss of effect of reflux action on rising vapors in those voids where no reflux flows. The distribution means 25 of this invention shown in detail in Figs. 2–4 inc. constitutes the essential subject matter of the invention and is of a type which eliminates the difficulties and inefficient operation of known types of distributors.

The distributor means 25 of the invention is a so-called screen weir type distributor. It comprises a plate 30 known as a distributor plate preferably of circular periphery having larger diametrical dimensions than the diameter of the conduit 26. In the embodiment shown, the distributor has seven tubular weirs 31 surrounded by screen thimbles 32, seven nozzles 33 containing liquid seal screens 40, a clamping plate 35 and six vapor risers 36.

The distributor plate 30 serves as a brace for maintaining the various parts of the distributors just described. The distributor plate 30 is wider in all dimensions than the inner walls of the conduit 26 so that it may be clamped between the adjacent ends of a pair of lengths 26a, 26b of such conduit in a horizontal position and with the walls of the conduit length 26a form a dam for downflowing reflux liquid effluent from the condenser 11. In the embodiment shown the portions 26a and 26b of the conduit 26 between which the distribution plate 30 is clamped are of glass, but other material may be utilized.

Tapped holes 37, seven in number herein, although the particular number is optional depending upon operating conditions, are provided in the distributor plate 30. A nozzle 33 is screwed into each of these openings 37. The tubular weirs 31 each consisting of a length of pipe having a longitudinally extending notch 39 spanning a portion of the length of the pipe and extending to the upper end of each weir pipe are mounted in the respective nozzles 33. The lower ends of the weir pipes 31 flare outwardly at 31a at their inner diameters for providing smooth nappes and are fitted as by a press fit and extend into the nozzles 33 terminating a short distance from the outlet ends thereof, for example, $\frac{1}{16}$ of an inch therefrom, to provide mounting space in each for a conically shaped screen 40, also secured in the respective nozzles 33 as by a press fit or otherwise. These screens 40 each have an apical hole 41 which prevents retention of solids by such screens. The closed end 39a (the crest) of the notch 39, will fall approximately at the level of the upper surface of the distributor disc 30 when only one weir is required. However, should conditions call for more than one weir, the crests of the weir notches 39a must be located at equal distances with respect to the level of the upper surface of the distributor plate if equal flows through all the weirs are desired. Preferably the notches 39 face toward the center of said disc and may have any desired shape such as rectangular or triangular or other contour and may have sharp or rounded defining edges.

Screen thimbles 32 of substantially tubular shape surround the weir tubes 31 being concentrically arranged respectively one about each such tube. Each thimble 32 has a hole 32a in its side wall near its upper end. Each hole 32a is a precaution against the trapping of reflux liquid in the hollow space between the thimbles 32 and the weir tubes 31.

Tapped holes 43, six in number in this instance, are provided in the disc 30 to threadedly receive the vapor risers 36 which extend vertically in parallellism with the weir tubes 31.

The retaining plate 35 has holes 45 to receive the upper ends of the risers 36 and overlies the upper ends of the thimbles 32 and is removably held in retaining position by wing nuts 46 screwed onto the vertical bolts 47 extending upwardly from the distributor disc 30.

The completely assembled distributor means 25 just described is mounted in a horizontal position by clamping the plate 30 between the sections 26a and 26b of conduit 26 above the column 18. The reflux liquid from condenser 11 flows from conduit 26 and through the screen thimbles 32 and weir notches 39 onto the conical liquid seal screens 40. Here flow through the screens is retarded momentarily by the pressure created by vapor rising from the top of column 18 prior to upward passage of the vapor in the vapor risers 36. The obstruction of the vapor path, because of the presence of risers 36 and disc 30 creates a pressure drop across the distributor means 25 and flow of reflux liquid downwardly through the conical seal screens 40 does not commence until an equivalent pressure head of downcoming reflux liquid is accumulated above the screens 40. When this head is achieved, quiet streams with smooth nappes start to flow from the liquid seal screens 40 and distribute themselves evenly over the top of the packing material 20 in the column 18 so that downflow of reflux fluid occurs substantially uniform through the voids in said packing material. The height of reflux liquid in the weir tubes 31 above the seal screens 40 is termed the downspout length.

Figure 5:
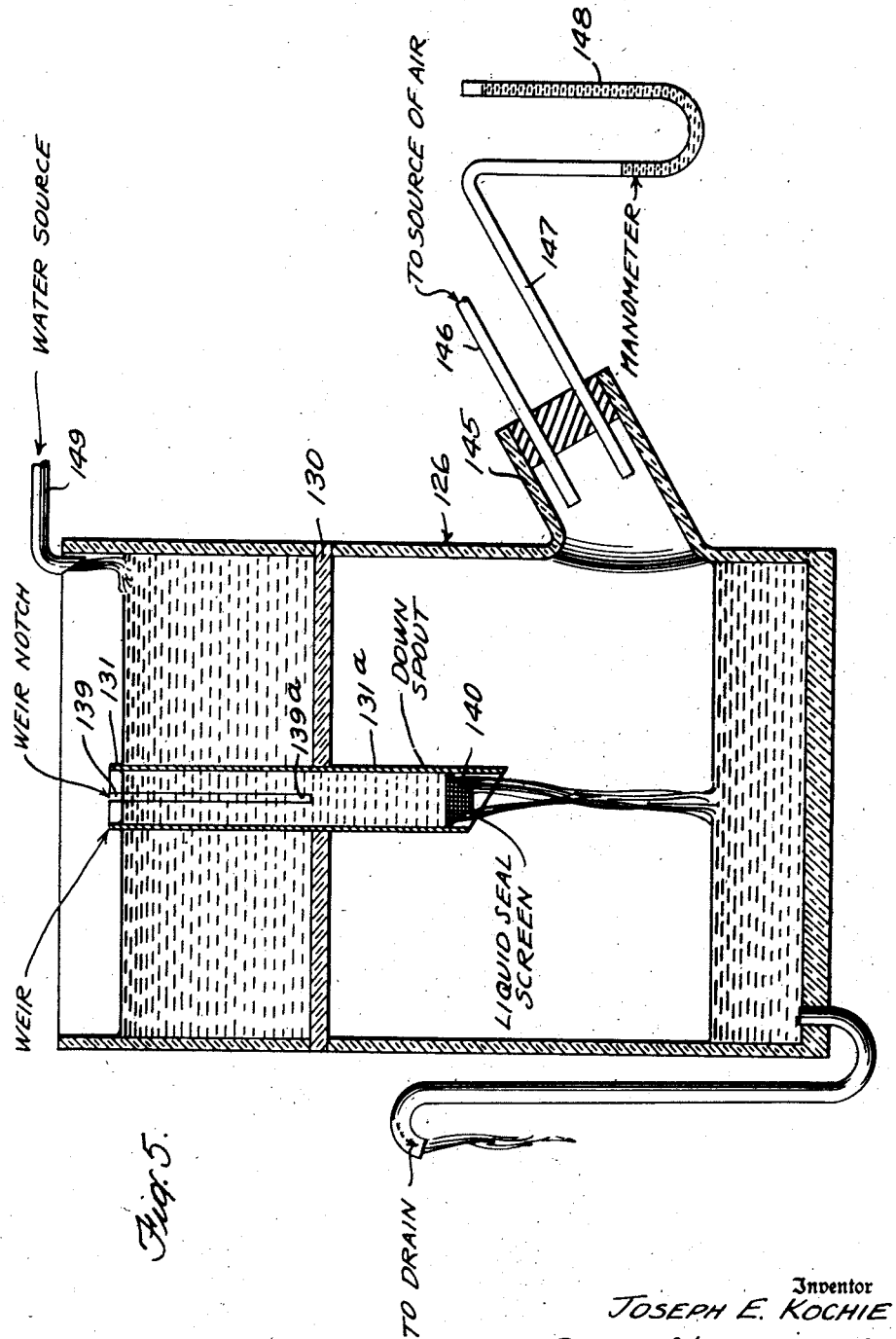
Fig. 5 is a vertical section of a simulated distillation construction embodying the invention and illustrating further structural details thereof.

Fig. 5 illustrates test equipment for determining the efficacy of the invention. In this figure the glass tube 126 includes a distributor plate 130 corresponding to plate 30 acting as a dam in the tube 126. A weir tube 131 corresponding to tube 31 having a vertical slot or notch 139 projects through the plate 130, with the notch 139 lying above the upper surface of the plate 130. The closed end 139a of the notch lies substantially at the level of the upper surface of the plate 130. The downwardly projecting portion 131a of the weir tube 131 which lies below the plate 130 includes a conical seal screen 140 adjacent its lower end which functions in the same way as seal screens 40. The height of liquid in the weir tube 131 above the screen 140 is termed the downspout length. An offset portion 145 provides an inlet 146 from a source of air pressure and connection 147 to a manometer 148. In utilizing the test apparatus of Fig. 5 water at a controlled and measured rate is introduced through conduit 149 for delivery above the surface of plate or dam 130 while air under pressure is introduced via conduit 146 to the space below the plate or dam 130 to create a measured pressure drop at the seal screen 140. The introduction of water simulates the reflux flow rate in actual practice while the introduction of air through conduit 146 simulates vapor rising from the still in actual practice which creates the pressure drop at the liquid seal screen 140.

This test apparatus indicates that the length of the downspout depends on the pressure drop. It also shows that as the pressure drop increases the liquid inside of the weir rises above the distributor plate level. This is undesirable because such rise affects liquid redistribution considerably because of greater spillway area above the distribution plate.

Actual tests on apparatus of Figs. 1–4 inc. where the reflux liquid was 15% benzene, 85% ethylene dichloride and where seven seal screen weir tubes 31, 3/8" inside diameter, were utilized each having a rectangular notch 0.048" wide by 2.75" high gave the following confirmatory results.

| Reflux Gal./hr. | Pressure Drop Δp—inches of water | Liquid Height on plate 30-inches |
|---|---|---|
| 10.0 | 0.20 | 0.313 |
| 16.0 | 0.18 | 0.375 |
| 24.3 | 0.30 | 0.531 |
| 49.8 | 0.60 | 0.781 |
| 69.7 | 0.75 | 0.969 |
| 90.5 | 1.18 | 1.250 |
| 110.0 | 1.60 | 2.156 |

These figures indicate clearly that while in general liquid height above the distributor plate increased with increased pressure drop, at higher reflux rates, the liquid height increased sharply relative to pressure drop indicating excessive retardation of reflux flow through the seal screens. Thus it is best to operate the weirs so that the downspout portions thereof do not exceed the height of the plate 30 above the seal screens for all reflux flow rates at which the distributor means is intended to operate. With seven weirs as shown the downspout height should be about 1 inch while the optimum maximum reflux flow-rate should not exceed approximately 70 gallons per hour. This reflux flow rate can, however, be increased by increasing the number of weirs above seven or by increasing the length of the downspout so that the liquid level regardless of flow rate will not rise above the level of the upper surface of the plate 30, or by increasing the number of vapor risers. While some specific dimensions have been given, these as well as the numbers of weir tubes and vapor risers can be varied to fit particular operating conditions.

While specific embodiments are herein disclosed variations in structural detail within the scope of the claims are possible and are contemplated. There is no intention, therefore, of limitation to the exact details shown and described.

What is claimed is:

1. In fractionating apparatus a column, vapor and liquid contact means in the column wherein rising vapor and descending liquid flow countercurrent to and in contact with one another, distributing means for reflux liquid above the contact means for distributing reflux liquid to said contact means, the distributing means comprising a reflux liquid container disposed above the contact means, a dam in the path of flow of reflux liquid from said container to the contact means and in the path of flow of gases upwardly from said contact means, vapor-conducting risers extending upwardly from the dam and into said container, the risers having a gas inlet in communication with said column through the dam so as to receive vapor flowing upwardly from said contact means and a vapor outlet located above the normal liquid level in said container, tubular liquid-conducting means extending upwardly in the container from the dam and having a liquid discharge outlet in communication through the dam with the column below the dam, said tubular liquid-conducting means being arranged to discharge reflux liquid onto said contacting means at a plurality of spaced points, said liquid discharge outlet being in communication with the reflux liquid container through a slot in the tubular conducting means extending axially thereof above said dam, and liquid seal means disposed in the path of flow of reflux liquid from said container through the liquid discharge outlet of the tubular conducting means, said liquid seal means being of screen material.

2. The apparatus of claim 1 wherein the slot in said tubular conducting means extends substantially from the surface of the dam upwardly.

3. The apparatus of claim 1 wherein the liquid seal means comprises a screen which is of substantially conical shape and is positioned in said path of flow of the liquid with the apex of said screen directed downwardly.

4. The apparatus of claim 1 wherein the slots have substantially rectangular shape.

5. In fractionating apparatus a column, vapor and liquid contact means in the column wherein rising vapor and descending liquid flow countercurrent to and in contact with one another, distributing means for reflux liquid above the contact means for distributing reflux liquid to said contact means, the distributing means comprising a reflux liquid container disposed above the contact means, a dam in the path of flow of reflux liquid from said container to the contact means and in the path of flow of gases upwardly from said contact means, vapor-conducting risers extending upwardly from the dam and into said container, the risers having a gas inlet in communication with said column through the dam so as to receive vapor flowing upwardly from said contact means and a vapor outlet located above the normal liquid level in said container, tubular liquid-conducting means extending upwardly in the container from the dam and having a liquid discharge outlet in communication through the dam with the column below the dam, a screen thimble surrounding the tubular conducting means, said thimble being concentric to and in spaced relationship with the tubular conducting means, the tubular liquid-conducting means being arranged to discharge reflux liquid onto said contacting means at a plurality of spaced points, said liquid discharge outlet of the tubular conducting means being in communication with the reflux liquid container through said screen thimble and a slot in the tubular conducting means extending axially thereof above said dam, and liquid seal means disposed in the path of flow of reflux liquid from said container through the liquid discharge outlet of the tubular conducting means, said liquid seal means being of screen material.

6. The apparatus of claim 5 wherein the liquid discharge outlet of the tubular liquid-conducting means comprises a nozzle projecting below said dam and directed toward said vapor and liquid contact means.

7. The apparatus of claim 6 wherein the liquid seal means comprises a screen disposed in said nozzle in the path of flow of reflux liquid therethrough, said screen being of substantially conical shape with the apex thereof directed downwardly.

8. The apparatus of claim 7 wherein the slots in said tubular conducting means extend substantially from the surface of the dam upwardly and are of substantially rectangular shape.

9. The aparatus of claim 8 wherein the vapor-conducting risers consist of a plurality of spaced individual pipes and wherein said tubular liquid-conducting means consist of a plurality of spaced individual tubes.

10. The apparatus of claim 9 wherein said screen thimble has an opening adjacent the upper end thereof to prevent trapping of liquid in the space defined by the thimble means and the tubular liquid-conducting means which it surrounds.

11. In fractionating apparatus including a still, a condenser, a packed column and conduits connecting the still, packed column and condenser whereby vapor rising from the still flows upwardly from the still through the packed column to the condenser and reflux liquid from the condenser flows downwardly from the latter through the packed column toward the still, distributing means for reflux liquid disposed in the conduit connecting the condenser and the packed column and above the packing for distributing reflux liquid to said packing, said connecting conduit providing a reflux liquid container, a substantially horizontally extending dam in the path of flow of reflux liquid from said connecting conduit to the packing and in the path of flow of gases upwardly from said packing to the condenser, vapor-conducting risers extending upwardly from the dam and into said conduit connecting the condenser and the packed column, the risers having a gas inlet in communication with said column through the dam so as to receive vapor flowing upwardly from said packing and a vapor outlet located above the normal liquid level in said connecting conduit, tubular conducting means extending upwardly in the connecting conduit from the dam and having a liquid discharge outlet in communication through the dam with the column below the dam, a screen thimble surrounding the tubular conducting means, said thimble being concentric to and in spaced relationship with the tubular conducting means, the tubular liquid-conducting means being arranged to discharge reflux liquid onto said packing at a plurality of spaced points, said liquid discharge outlet being in communication with the reflux liquid-containing portion of the conduit connecting the condenser and the packed column through a slot in the tubular conducting means extending axially thereof above said dam, and liquid seal means disposed in the path of flow of reflux liquid from said liquid-containing portion of the connecting conduit through the liquid discharge outlet of the tubular conducting means, said liquid seal means being of screen material.

12. The apparatus of claim 11 wherein the vapor-conducting risers consist of a plurality of spaced individual pipes and wherein said tubular liquid-conducting means consist of a plurality of spaced individual tubes.

13. The apparatus of claim 12 wherein the liquid discharge outlet of spaced individual tubes comprises a nozzle projecting below said dam and directed toward the packing.

14. The apparatus of claim 13 wherein the liquid seal means comprises a screen disposed in said nozzle in the path of flow of reflux liquid therethrough, said screen being of substantially conical shape with the apex thereof directed downwardly.

15. The apparatus of claim 14 wherein the slots in said spaced individual tubes extend axially thereof from substantially the surface of the dam upwardly and are of rectangular shape.

JOSEPH E. KOCHIE.

References Cited in the file of this patent

UNITED STATES PATENTS

| Number | Name | Date |
|---|---|---|
| 185,900 | Ellerhorst | Jan. 2, 1877 |
| 1,384,938 | Crane | July 19, 1921 |
| 1,717,927 | Hughes et al. | June 18, 1929 |
| 1,846,248 | Clarke | Feb. 23, 1932 |
| 2,193,696 | Ramsaur | Mar. 12, 1940 |
| 2,231,828 | Kerr | Feb. 11, 1941 |
| 2,286,786 | Cloyd | June 16, 1942 |
| 2,328,029 | Porter | Aug. 31, 1943 |

FOREIGN PATENTS

| Number | Country | Date |
|---|---|---|
| 439,204 | Germany | Jan. 8, 1927 |